No. 623,416.  
J. A. McCRORY.  
HOSE COUPLING.  
(Application filed Apr. 19, 1898.)  
Patented Apr. 18, 1899.

(No Model.)

Witnesses  
C. N. Walker  
H. L. Amer

Inventor  
John A. McCrory.  
by V. D. Stockbridge  
his Attorney.

UNITED STATES PATENT OFFICE.

JOHN ALEXANDER McCRORY, OF ORANGE, TEXAS, ASSIGNOR OF ONE-HALF TO JAMES A. BONE, OF SAME PLACE.

HOSE-COUPLING.

SPECIFICATION forming part of Letters Patent No. 623,416, dated April 18, 1899.

Application filed April 19, 1898. Serial No. 678,171. (No model.)

*To all whom it may concern:*

Be it known that I, JOHN ALEXANDER MC-CRORY, a citizen of the United States, residing at Orange, in the county of Orange and State of Texas, have invented certain new and useful Improvements in Hose-Couplings; and I do hereby declare the following to be a full, clear, and exact description of the invention, such as will enable others skilled in the art to which it appertains to make and use the same.

The object of my invention is to provide an improved form of hose-coupling by means of which the ends of two hose-sections may be readily and quickly locked one to the other and disconnected when desired, forming a close joint between the two parts, which is impervious to water.

The invention consists of a coupling member secured to one end of the section of hose, having an annular shoulder upon its outer surface, the said outer surface converging toward its end and the inner surface diverging, and a coupling sleeve or member adapted to fit therein and provided with spring-pressed locking-jaws adapted to engage said shoulder.

The invention also consists in other details of construction and combinations of parts, which will be hereinafter more fully described and claimed.

Figure 1:
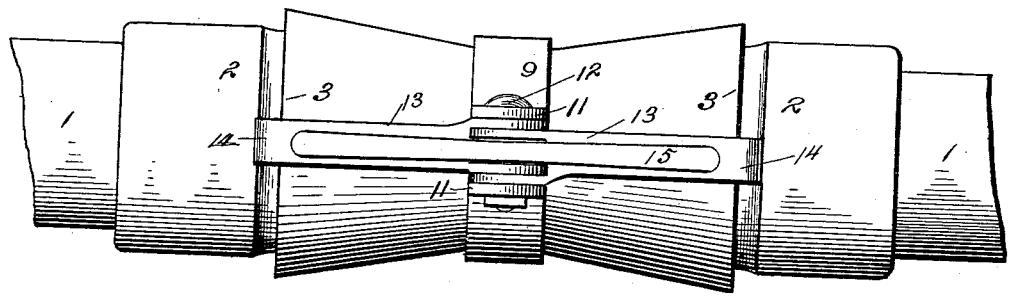
Figure 2:
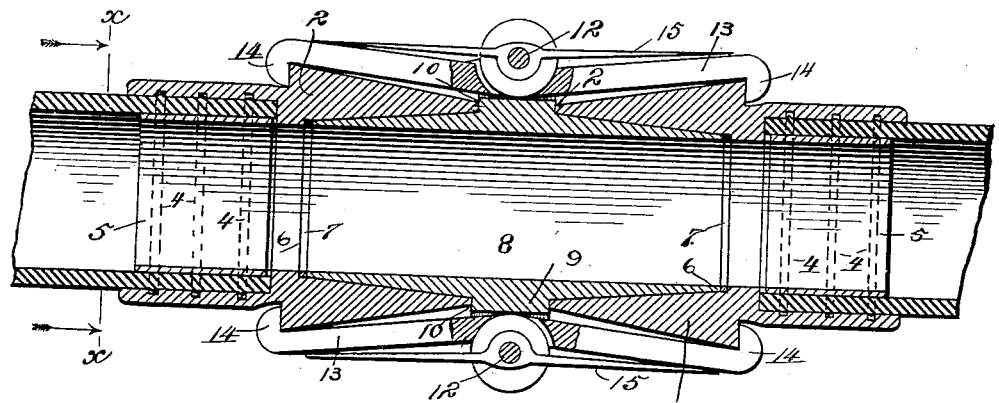
Figure 3:
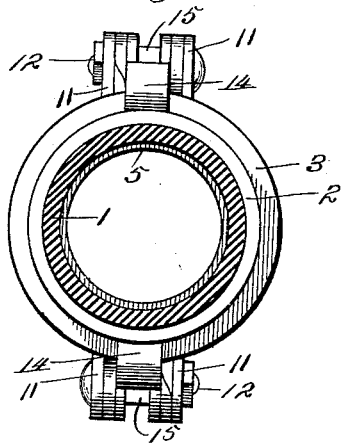

In the drawings forming part of this specification, Figure 1 is an elevation illustrative of my coupling in its locked position. Fig. 2 is a central longitudinal section through the same, and Fig. 3 is a cross-section on the line *x x* of Fig. 2.

Like reference-numerals indicate like parts in the different views.

In carrying out my invention I provide upon the ends of the hose-sections 1 1 the coupling members 2 2, each being identical with the other. The member 2 is formed with an external shoulder 3 thereon, and the outer surface thereof converges from said shoulder to its forward end, and the inner surface of said member from a point beneath the shoulder diverges. The shank or stem of the member 2 is formed with corrugations 4 4 upon its inner surface, within which the flexible material of which the hose-section 1 is made is forced and held by means of the metallic sleeve 5, the said sleeve being located within the hose-section and clamping the latter against the inner surface of the member 2. The opening through the stem is cylindrical, and at the point where said opening meets the diverging inner surface of the forward end of the member 2 an internal annular shoulder 6 is formed, at which point a packing-ring 7 is preferably located.

In connection with the members 2 I employ a coupling sleeve or member 8, the same having a central cylindrical opening therethrough of the same diameter as the opening through the stems of the members 2 and having upon its outer surface an annular band or reinforcing-strip 9, which provides the shoulders 10, against which the forward ends of the members 2 abut. The outer surface of the sleeve 8 from the band 9 converges, as clearly shown, the angle of convergence being equal to the angle of divergence of the inner surface of the members 2. Upon opposite sides of the sleeve 8 the band or reinforcing-strip 9 is formed into lugs or ears 11, which are arranged in pairs and are parallel to each other. Between the members of each pair of the lugs 11 are pivoted upon a transversely-extending pin or bolt 12 oppositely-extending clamping-jaws 13 13, the inner ends of said jaws being bifurcated, as shown, and the outer ends formed with hooks or engaging portions 14. Between the bifurcated inner ends of the clamping-jaws 13 is located a spring 15, the same being secured to the transverse pin or bolt 12 and having its opposite ends engaging the outer surfaces of the clamping-jaws 13 for the purpose of holding the engaging portions 14 thereon normally in their innermost positions.

In using the device it is merely necessary in order to couple the two sections of hose to force the sleeve 8 into the coupling member 2 of the adjacent hose-section and force the same to its seat, as shown in Fig. 2 of the drawings. In doing this the hooks 14 upon the ends of the clamping-jaws 13 will ride over the inclined outer surface of said member and finally seat themselves behind the shoulder 3, thereby holding the members 2 and 8 together. When thus seated, the extreme outer end of the member 2 abuts against the shoulder 10 and the extreme outer end of the sleeve 8 bears against the packing-ring 7, seated against the shoulder 6 on the inside of the member 2. Leakage is thereby effectually prevented and the accidental disconnection of the parts avoided. To uncouple the two sections, it is merely necessary to retract the clamping-jaws against the action of the spring 15 and draw the parts away from each other.

Having thus described my invention, what I claim as new, and desire to secure by Letters Patent, is—

1. In a hose-coupling, a member having an external shoulder and a tapering extension outside of said shoulder and a member coacting therewith having lugs arranged in pairs thereon, clamping-jaws pivoted between said lugs and adapted to engage said shoulder, and springs for normally urging said clamping-jaws inwardly.

2. In a hose-coupling, a member secured to the hose-section, having an external annular shoulder thereon, a converging outer surface leading from said shoulder to its outer end, and a diverging inner surface leading from a point beneath said shoulder to its outer end, and a member coacting therewith, having a peripheral band thereon and converging outer surfaces adapted to fit within the diverging inner surface of the other member, clamping-jaws adapted to engage said shoulder pivoted upon lugs formed on said band, and a spring for normally urging said clamping-jaws inwardly, as and for the purpose set forth.

3. In a hose-coupling, a member whose stem is formed with a cylindrical inner surface, and whose outer surface is formed with an annular shoulder and with a converging portion leading from said shoulder to its end, and whose inner surface from a point beneath said end is diverging, forming an internal annular shoulder, a packing-ring fitting against said internal shoulder, and a second member adapted to coact therewith, having a peripheral band thereon, having a cylindrical inner surface and a converging outer surface, lugs formed in said band upon opposite sides, clamping-jaws pivoted between said lugs and adapted to engage said external shoulder, and springs for normally urging said clamping-jaws inwardly.

In testimony whereof I affix my signature in presence of two witnesses.

JOHN ALEXANDER McCRORY.

Witnesses:
M. A. WATSON,
S. CHENAULT.